(12) United States Patent
Avanzi et al.

(10) Patent No.: US 12,073,104 B1
(45) Date of Patent: Aug. 27, 2024

(54) DYNAMIC ADJUSTMENT OF MEMORY FOR STORING PROTECTION METADATA

(71) Applicant: Arm Limited, Cambridge (GB)

(72) Inventors: Roberto Avanzi, Munich (DE); Andreas Lars Sandberg, Cambridge (GB); David Helmut Schall, Bad Rappenau (DE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/299,763

(22) Filed: Apr. 13, 2023

(51) Int. Cl.
*G06F 3/06* (2006.01)

(52) U.S. Cl.
CPC .......... *G06F 3/0644* (2013.01); *G06F 3/0623* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 5,627,987 A * | 5/1997 | Nozue | ................. | G06F 12/1458 711/100 |
| 5,873,127 A * | 2/1999 | Harvey | ............... | G06F 12/1009 711/E12.059 |
| 7,287,140 B1 * | 10/2007 | Asanovic | ............ | G06F 12/1483 711/208 |
| 8,209,510 B1 * | 6/2012 | Thathapudi | ............. | G06F 21/60 711/171 |
| 2007/0168567 A1 * | 7/2007 | Boyd | ...................... | G06F 9/544 710/5 |
| 2015/0268874 A1 * | 9/2015 | Bollandoor | ........... | G06F 9/4406 711/104 |
| 2017/0123693 A1 * | 5/2017 | Kegel | ................... | G06F 12/023 |
| 2021/0311884 A1 * | 10/2021 | Grocutt | ............... | G06F 12/1416 |
| 2023/0185658 A1 * | 6/2023 | Galbi | .................... | G06F 11/073 714/6.11 |
| 2024/0054079 A1 * | 2/2024 | Han | ..................... | G06F 12/0882 |

FOREIGN PATENT DOCUMENTS

GB  2594062 A  * 10/2021 ............. G06F 12/14

* cited by examiner

*Primary Examiner* — Edward J Dudek, Jr.
*Assistant Examiner* — Ralph A Verderamo, III
(74) *Attorney, Agent, or Firm* — NIXON & VANDERHYE P.C.

(57) ABSTRACT

There is provided a memory protection unit configured to maintain region metadata associated with storage regions of off-chip storage and protection metadata associated with each of the storage regions. The protection metadata is stored in the off-chip storage, and the region metadata encodes whether each of the storage regions belongs to a set of protected storage regions or to a set of unprotected storage regions and encodes information indicating corresponding protection metadata associated with each storage region. The memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

20 Claims, 12 Drawing Sheets

DYNAMIC ADJUSTMENT OF MEMORY FOR STORING PROTECTION METADATA

TECHNICAL FIELD

The present invention relates to data processing. More particularly the present invention relates to a memory protection unit, a method of operating a memory protection unit, and a non-transitory computer readable medium to store computer-readable code for fabrication of a memory protection unit.

BACKGROUND

There are security vulnerabilities that are associated with data stored in off-chip storage. In particular, data that is stored off-chip could be read or modified without the knowledge of processes occurring on the chip. In order to mitigate this risk, the data stored in off-chip storage can be protected using protection metadata associated with protected storage regions. Storing protection metadata requires additional storage that can result in large overheads.

SUMMARY

In some configurations of the present techniques there is provided a memory protection unit configured to maintain:
region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions,
wherein the memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

In some configurations of the present techniques there is provided a method of operating a memory protection unit comprising:
maintaining region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions; and
updating the region metadata in response to a region update request identifying a given storage region for which the region metadata is to be modified and dynamically adjusting an amount of memory required to store protection metadata associated with the set of protected storage regions in response to the update to the region metadata.

In some configurations of the present techniques there is provided a non-transitory computer readable medium to store computer-readable code for fabrication of a memory protection unit configured to maintain region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions,
wherein the memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
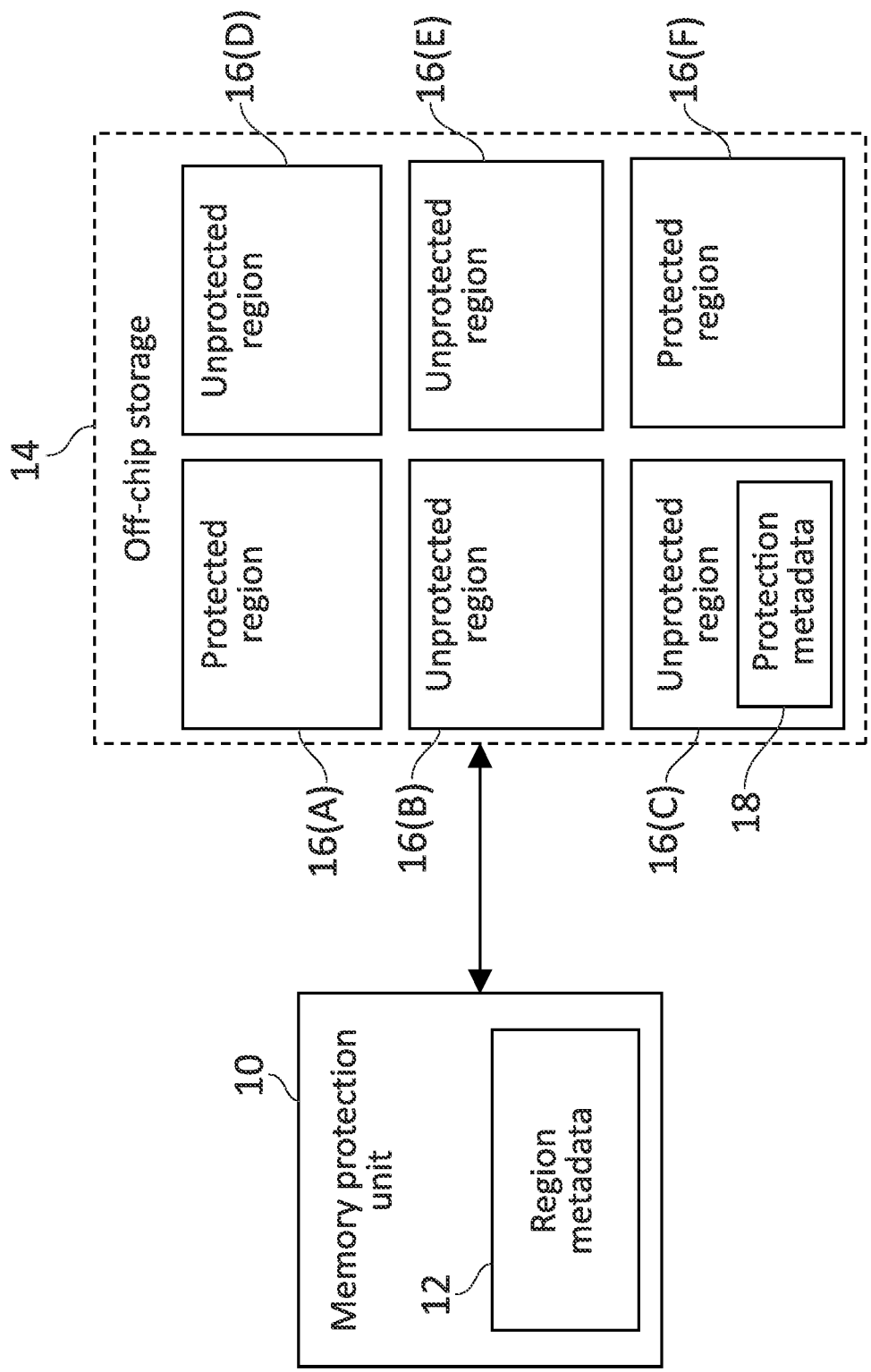
FIG. 1 schematically illustrates a memory protection unit according to some configurations of the present techniques.

Before discussing the configurations with reference to the accompanying figures, the following description of configurations is provided.

In some configurations there is provided a memory protection unit configured to maintain region metadata associated with storage regions of off-chip storage and protection metadata associated with each of the storage regions. The protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions. The memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

Storage of data in off-chip storage (memory) presents a potential security vulnerability because the data stored in the off-chip storage can be read or modified without the knowledge of processes that are occurring on the chip. In order to mitigate this risk, the data can be associated with protection metadata that is used to either prevent reading and/or provide an indication that the data has been modified. The protection metadata is provided in addition to the data and needs to be stored within the memory and managed, for example, by a memory management unit. This protection metadata can become significant and, as a result, maintaining and storing the protection metadata can result in a large memory overhead.

The inventors have realised that some processes may be less important from a security perspective and may generate data which it is not necessary to protect. Therefore, the present techniques provide region metadata that is used to identify protected regions (secure regions) of the off-chip storage and unprotected regions (non-secure regions) of the off-chip storage. The region metadata also identifies a storage location for the protection metadata that is associated with each of the protected regions of the off-chip storage. The region metadata can be dynamically modified in response to a region update request to increase the number of protected regions and, hence, to decrease the number of unprotected regions or to increase the number of unprotected region and, hence, to decrease the number of protected regions. As the number of protected regions is increased, the amount of protection metadata that must be stored and maintained is also increased. Therefore, the memory protection unit is configured to dynamically adjust (reallocate) the amount of memory that is allocated to store the protection metadata in response to the region update request. By dynamically adjusting the amount of memory that is allocated to the protection metadata, a more efficient use of storage is achieved.

The protection metadata can be stored anywhere in the off-chip storage and may be distributed throughout the off-chip storage or aggregated within a single subsection of the off-chip storage. The storage regions of the off chip storage may be fixed sized storage regions each corresponding to a predetermined address range. Alternatively, the storage regions of the off-chip storage may be specified dynamically, for example, in the region update request.

In some configurations the protection metadata comprises encryption metadata indicative of an encryption key used to encrypt data stored in one or more of the protected storage regions. The encrypted data may be generated using an encryption process that is performed using the encryption key. The encryption process is a two way process such that the encrypted data may be decrypted using the encryption key that was used to generate the encrypted data, for example, when the data is read by an on-chip process. The encryption key therefore protects the data by rendering it unreadable by any entity that does not have the encryption key. The encryption metadata may be the encryption key or data from which the encryption key is generated. In some configurations, the encryption metadata may comprise a tweak which is combined with further encryption data in order to generate the encryption key.

In some configurations the protection metadata comprises integrity protection metadata generated from and representative of data stored in one or more of the protected storage regions. The integrity metadata may be derived from the data using one or more functions. The one or more functions may be lossy functions so that the amount of integrity data generated is less than the amount of data. The one or more functions may be sensitive to changes in the data to produce a change in the integrity data. In this way, it can be determined if the data has been modified by comparing the integrity data comprised in the protection metadata and associated with a particular data item against newly derived integrity data associated with a current version of the particular data item. If the integrity data and the newly derived integrity data match, then it can be inferred that the particular data item has not been modified between the time at which the integrity data was derived and the time at which the newly derived integrity data is derived. On the other hand, where the particular data item has been modified, the integrity data and the newly derived integrity data would not match and it can be determined that the data has been modified. In some configurations, the protection metadata comprises both integrity protection metadata and encryption metadata with the integrity protection metadata being suitable for determining whether or not the data has been modified and the encryption metadata being used to prevent the data from being read. In some configurations, the integrity protection metadata may be a messages authentication code (MAC) that can be used to validate the integrity of the data item.

In some configurations the memory protection unit comprises metadata storage circuitry to securely store at least a portion of the region metadata. The metadata storage circuitry can be provided as a discrete on-chip block of storage circuitry that is accessible to the memory protection unit, or as an integrated part of the memory protection unit. By providing on-chip storage, the portion of the region metadata is securely stored without the need to provide additional protection metadata for the portion of the region metadata or to perform additional memory operations to retrieve the region metadata from the off-chip storage.

The portion of the region metadata may comprise all of the region metadata. However, in some configurations the memory protection unit is configured to store a further portion of the region metadata in the unprotected storage regions of the off chip storage; and the portion comprises region integrity protection metadata generated from and representative of the further portion of the region metadata. Storing the further portion of the region metadata in the off-chip storage provides for a compact and lightweight implementation of the memory protection unit. The further portion of the region metadata is protected from being modified through the provision of the region integrity protection metadata. In some configurations, the portion and the further portion of the region metadata are different portions that, together, comprise the total amount of region metadata.

The region metadata protection information can take various forms. In some configurations the portion further comprises region encryption metadata indicative of a region encryption key used to encrypt the further portion; and the memory protection unit is responsive to the region update request to modify the region metadata associated with the given storage region, and to update the region protection metadata. In some configurations, the region metadata protection information may be a combination of the encryption key and the region integrity protection metadata. This approach provides combined assurance that the data in the protected region has not been read and that it has not been tampered with. In configurations for which the region metadata is protected using encryption metadata comprised in the region metadata protection information the encryption key used to encrypt/decrypt the region metadata may be derived directly from the region metadata protection information or from a common secret key that is modified using a tweak (information derived from the region metadata protection information that is not necessarily secret). Hence, each time the region metadata is modified, either a different encryption key is used or a different tweak is used. This approach mitigates against replay attacks where an attacker may attempt to gain access to secure data by reinjecting previously observed data into the memory, into the chip, or into the memory protection unit.

In some configurations the memory protection unit is responsive to a transfer of a data item from secure storage to a region of the off-chip storage and when the region metadata associated with the region indicates that the region belongs to the set of protected storage regions, to perform a protection process to protect the data item, the protection process based on the protection metadata identified in the region metadata as being associated with the region. The transfer of the data item to the off-chip storage may be a write request specifying a memory address to which the data item is to be written. Based on the memory address, the memory protection unit can perform a lookup using the region metadata to identify whether the memory address belongs to a protected region or to an unprotected region and, if the memory address belongs to a protected region, to also identify a location of the protection metadata that is associated with that protected region.

In some configurations the protection process comprises generating an encrypted data item by performing an encryption process on the data item, the encryption process based on encryption metadata comprised in the protection metadata identified in the region metadata as being associated with the region, and to transfer the encrypted data item to the region of the off-chip storage. In some configurations the encrypted data is written in place of the data item to the protected region of the off-chip storage. In other configurations, the encrypted data is an encrypted hash of the data item, for example, a message authentication code (MAC), that can be used to validate the integrity of the data item during a subsequent read operation. In such configurations, both the encrypted data and the data item are stored to the off-chip storage.

In some configurations the encryption process comprises encrypting the data item using an encryption key derived based on a global encryption key modified based on the region metadata encryption information. In such configurations, the global encryption key is stored on chip and may be modified by the region metadata encryption information. Advantageously, such an approach does not require the region metadata encryption information to be stored securely so long as the global encryption key is not public. In some alternative configurations, the encryption key is provided by the region metadata encryption information.

In some configurations the memory protection unit is responsive to the transfer of the data item from the secure storage to the region of off-chip storage and when the region metadata associated with the region indicates that the region belongs to the set of unprotected storage regions, to transfer the data item to the region of the off-chip storage without performing the encryption process. In such configurations, the memory protection unit performs the lookup using the region metadata to determine whether the transfer of the data item is to an unprotected region. If the transfer is to an unprotected region, the memory protection unit can avoid the steps of retrieving the protection metadata and performing the encryption process resulting in a reduction in resource usage and an overall power saving.

In some configurations the memory protection process comprises updating the protection metadata associated with the region. Updating the protection metadata associated with the region when data items are transferred to that region ensures that the protection metadata is up to date and reflects the data stored in that region. For configurations in which the protection metadata comprises integrity protection metadata, the memory protection process may comprise updating the integrity protection metadata to reflect the modified data in the region. For configurations in which the protection metadata comprises encryption metadata indicative of an encryption key, the encryption metadata may also be changed in response to a transfer of the data item. Hence, each time the data in a region is modified, the encryption metadata is modified to indicate a different input that is used for the encryption process. In some configurations, the encryption metadata indicates a tweak that is used to generate the encryption key as the input to the encryption process in combination with a master encryption key which may be statically defined. Alternatively or in addition, one or more counters may be used in the encryption process. The tweak and/or the one or more counters may be updated as part of the memory protection process. This approach mitigates against replay attacks where an attacker may attempt to gain access to secure data by reinjecting (retransmitting) previously observed data into the memory, into the chip, or into the memory protection unit.

The protection metadata can be stored in a variety of formats that may provide integrity protection metadata and/or encryption keys or tweaks for the protected storage regions at a variety of different granularities. In some configurations each storage region comprises a plurality of storage locations, and the memory protection unit is configured to maintain, as part of the protection metadata, data location specific protection metadata associated with each of the plurality of storage locations that comprise that storage region. When data stored in one of the plurality of regions is modified, the protection metadata that is associated with that storage region may also need modifying. Furthermore, where the protection metadata comprises encryption metadata indicative of an encryption key, any existing data that is stored in that one of the plurality of regions may require rewriting using the encryption key generated from or identified in the encryption metadata. Otherwise, there could be an inconsistency between the encrypted data and the protection metadata which could result in data corruption. This approach mitigates against replay attacks for the storage region but requires a memory intensive rewrite of data when the protection metadata is modified. By dividing the protection metadata into data location specific protection metadata, a rewrite of all data that is associated with the region can be avoided resulting in a reduced memory overhead. In addition, where the protection metadata is integrity protection metadata, the amount of data required to regenerate that integrity protection metadata for one of the plurality of regions is reduced, resulting in a simpler implementation. In some configurations, the plurality of storage locations comprises blocks of a size that is an integer multiple of the systems cache line. For example, the plurality of storage locations may comprise blocks that are 1, 2, 3, etc. times the size of the systems cache line.

In some configurations the protection metadata comprises integrity protection metadata associated with the region and the protection process comprises updating multiple levels of the integrity protection metadata. In some configurations, the integrity protection metadata may be arranged as an integrity protection tree. An integrity tree provides a hierarchical means for protecting the integrity of data stored in the region. The data item itself may be protected by a leaf node of the integrity tree and each node, other than the leaf nodes, of the integrity tree may be generated from and indicative of a plurality of nodes that are one hierarchical level closer to the leaf nodes. In such configurations, the protection process comprises updating each level of the integrity tree starting from the leaf node and working towards the root node.

The reallocation of regions of the off-chip storage from being unprotected regions to protected regions can be handled in a variety of ways. In some configurations the memory protection unit is responsive to the region update request, when the given storage region is one of the set of unprotected storage regions and the region update request is to modify the given storage region such that it belongs to the set of protected storage regions, to perform a protected region initialisation process comprising modifying the region metadata associated with the given region to indicate that the given region is one of the set of protected regions, allocating memory in the off-chip storage to store protection metadata associated with the given storage region, and initialising the protection metadata associated with the given storage region. In this way, the initialisation process updates the region metadata to identify the given region as one of the protected regions. Such an update may comprise adding information indicating that the given region is one of the protected regions or modifying a previous portion of the region metadata, indicating that the given region was an unprotected region, to indicate that the given region now belongs to the set of protected regions. The update process also dynamically modifies the amount of memory that is allocated to store protection metadata that will be generated in relation to the given region and initialises the protection metadata. Initialising the protection metadata ensures that any previous protection metadata that was generated, for example, at a previous instance of the given region being allocated as a protected region, is not interpreted as the current protection metadata for the given region.

In some configurations the protected region initialisation processes comprises zero filling the given storage region. Zero filling the given storage region ensures that no data or metadata, that was previously associated with the given region, is maintained once the given region is allocated as a protected region. In some alternative configurations, the initialisation process comprises writing random data to the given storage region.

The initialisation of the protection metadata can comprise generating a new set of protection metadata as a predefined set of initial protection metadata. Alternatively, in some configurations the memory protection unit is configured to: encode, as part of the region metadata, historical protection data associated with each storage region; and initialise the protection metadata associated with the given storage region as new protection metadata that is not included in the historical protection metadata associated with the given storage region. In such configurations, where the given region has previously belonged to the set of protected regions, a range of different protection metadata may have been used to protect that region. In order to mitigate replay attacks, it is beneficial to avoid repeating the same protection metadata as has been previously used for the given region. Hence, the storage of historical protection metadata as part of the region metadata can be used to ensure that no sets of protection metadata are repeated.

In some configurations the protection metadata is integrity tree information comprising a plurality of counters associated with the region; the data location specific protection metadata comprises at least one of the plurality of counters; and the historical protection data associated with each storage region comprises a largest counter value of the plurality of counters associated with that storage region. An integrity tree comprises a plurality of nodes arranged in a tree like structure with a single root node, (optionally) one or more intermediate levels of nodes and leaf nodes. Each of the plurality of nodes comprises a plurality of counters. The data items associated with the counters of the root node and the (optional) intermediate levels of nodes are lower level nodes of the data integrity tree. The data items associated with the counters of the leaf node are data items to be protected. In this way each data item is protected by counters comprised in a leaf node of the plurality of nodes, each of the nodes of the data integrity tree is protected by counters comprised in a layer of nodes that is closer to the root node. The counters of the root node are stored in secure storage, for example, integrated into the memory protection unit. Thus, each node of the plurality of nodes is protected by the nodes that are one layer closer to the root node. An integrity tree provides the means to increase the number of data items protected whilst only retaining one set of counters in the secure storage. Each node of the integrity tree corresponds to a region of the off-chip storage and the counters provided in the node of the integrity tree each correspond to a specific location. Each counter is modified (e.g., incremented) in response to the transfer of a data item from secure storage to the off-chip storage. By storing, as the historical protection data, a single largest counter value of the plurality of counter values, the integrity can be reinitialised at a new counter value to ensure that none of the counter values correspond to a previously used counter value, thereby mitigating against replay attacks. In some configurations, a root node of the integrity tree is stored in secure memory or within a statically allocated portion of the protection metadata. In some alternative configurations, the protection metadata can be any form of integrity tree, hierarchical integrity protection method and/or other integrity protection method as would be known to the skilled person.

In some configurations the new protection metadata comprises a next counter value subsequent to the largest counter value. Alternatively, the new protection metadata may take a random value greater than the largest counter value.

In some configurations the historical protection metadata is initialised to a predefined value. For example, the historical protection metadata may be initialised to −1 (minus one) such that when a first new protection metadata is generated it takes, as the value subsequent to the largest counter value, a value of 0 (zero).

In some configurations the plurality of counters are arranged in a tree structure and each counter is implemented as one of: a counter; a linear feedback shift register; and a non-linear feedback shift register. A linear/non-linear feedback shift register is a shift register whose input is a linear/non-linear function of its previous state. Such shift registers have a finite number of possible states and eventually repeat. Hence, linear/non-linear feedback shift registers can be used to implement a counter.

In some configurations initialising the protection metadata associated with the given storage region comprises generating random protection metadata. Whilst generating random protection metadata does not guarantee that there is no repetition of previously used protection metadata, this approach has the advantage that no historical protection metadata needs to be stored resulting in improved memory efficiency whilst greatly reducing the likelihood of a repetition of previous protection metadata. Furthermore, the use of random protection metadata as the protection metadata on initialisation ensures that the newly initialised protection metadata does not follow a predictable pattern, thereby further mitigating against potential data replay attacks.

In some configurations the memory protection unit is responsive to the region update request, when the given storage region is one of the set of protected storage regions and the region update request is to modify the given storage region such that it belongs to the set of unprotected storage regions, to perform an unprotected region initialisation process comprising modifying the region metadata associated with the given region to indicate that the given region is one of the set of unprotected regions and deallocating memory that was allocated to the protection metadata associated with the given region. Deallocating the memory that was allocated to the protection metadata results in a greater availability of memory for other purposes and results in an overall improvement in memory use. In some configurations, the unprotected region initialisation process comprises overwriting any data written to the given storage region.

The information indicating the corresponding encryption information can be encoded in different ways. In some configurations the information indicating the corresponding protection metadata associated with each storage region belonging to the set of protected storage regions is a protection metadata pointer indicative of a storage location of the protection metadata associated with that storage region. The storage regions may be of fixed size and of known location and the information indicating the corresponding protection metadata may be stored as a list of pointers, each indicating one of the fixed size storage regions. Alternatively, each protection metadata pointer can be stored with associated size and location metadata indicating the address range of the corresponding region.

The memory protection unit can also encode the information indicating whether each storage region is a protected or an unprotected storage region in combination with the protection metadata pointer. In some configurations the memory protection unit is configured to encode information indicating storage regions that belong to the set of non-protected storage regions by setting null data as the protection metadata pointer associated with those regions. In some configurations the null data is a value that exceeds a maximum possible pointer value, for example, a pointer value of all ones. Alternatively, an additional bit of data can be encoded, as part of the region metadata, to indicate whether the indicated region belongs to the set of protected storage regions or the set of unprotected storage regions.

In some configurations the memory protection unit is configured to store the protection metadata in one or more of the set of unprotected storage regions of the off-chip storage and to protect the protection metadata using top level protection metadata. The top level protection metadata may comprise top level integrity protection metadata, for example, a top level counter of an integrity tree and may include a top level MAC associated with the top level counter. Alternatively, or in addition, the top level protection metadata may include a master encryption key that is stored on chip, for example, in storage integrated into the memory protection unit or as a separate block of on-chip storage.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates a memory processing unit 10 according to various configurations of the present techniques. The memory protection unit 10 is arranged to maintain region metadata 12. The region metadata is indicative of whether regions 16 of off-chip storage 14 are protected regions 16(A), 16(F) or are unprotected regions 16(B), 16(C), 16(D), 16(E). The memory protection unit is also arranged to maintain protection metadata 18 for each of the plurality of regions 16. The protection metadata 18 is stored in the off-chip storage 14. The memory protection unit 10 is responsive to a region update request identifying a given storage region for which the region metadata 12 is to be modified to update the region metadata 12 and to dynamically modify the memory in the off-chip storage that is allocated to the protection metadata 18. The protection metadata 18 may itself be protected, for example, due to a structure of the protection metadata 18 which may be arranged as an integrity tree or other hierarchical integrity protection structure (for example, as described in relation to FIGS. 3 to 5) with a top level node of the integrity tree/ protection structure stored in a secure region of the chip storage.

Figure 2:
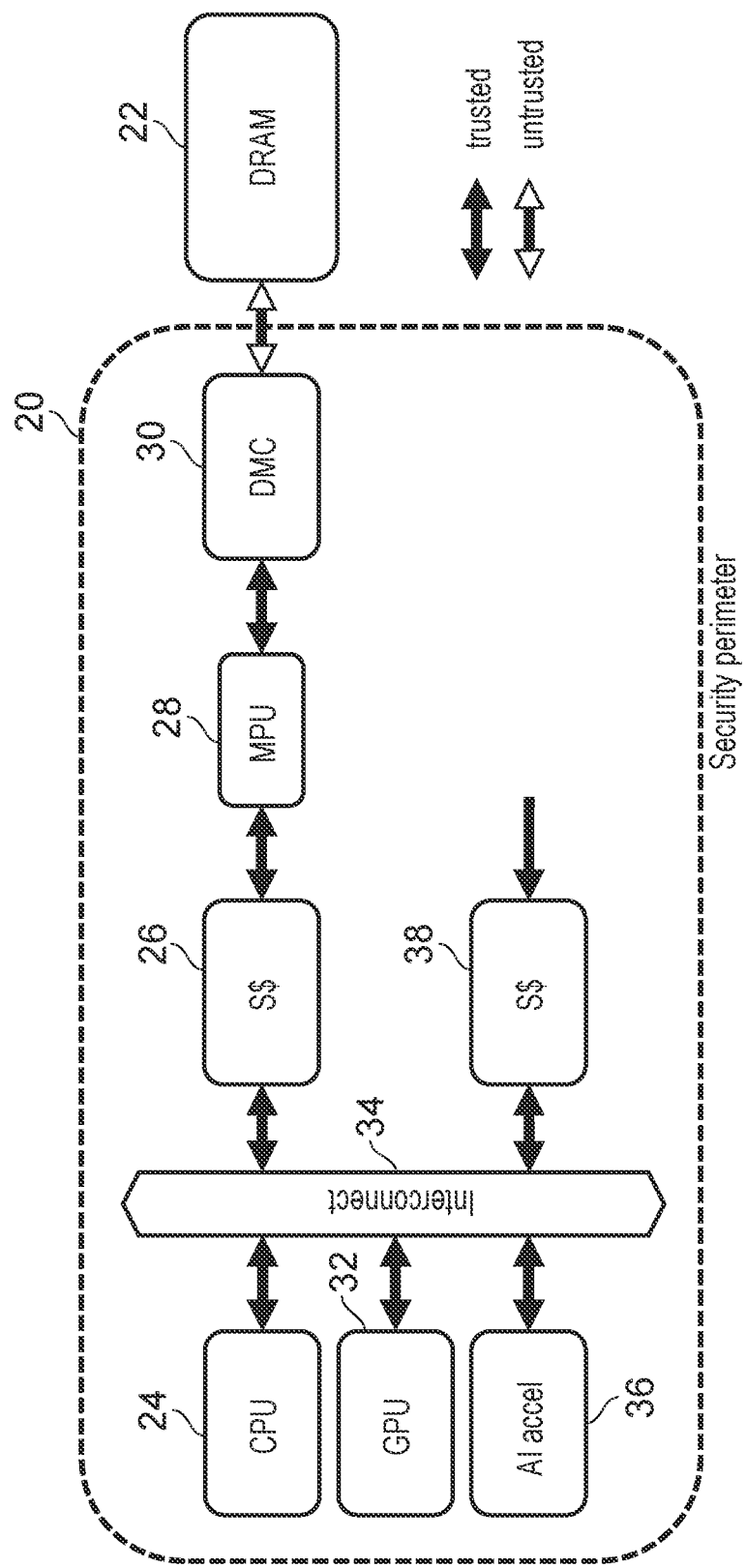
FIG. 2 schematically illustrates details of an apparatus comprising a memory protection unit according to some configurations of the present techniques.

FIG. 2 schematically illustrates details of an apparatus according some configurations of the present techniques. The data processing apparatus is provided with a secure region 20 surround by a security perimeter. Circuitry that is comprised within the secure region 20 is considered to be trusted and circuitry that outside of the secure region 20 is considered to be vulnerable to attack and therefore untrusted. For example, DRAM 22 is off-chip storage that is outside of the secure region 20 and, potentially, could be tampered with without the knowledge of components within the secure region. The secure region comprises dynamic memory controller 30 (DMC), a memory protection unit 28 (MPU) which includes integrated counter control circuitry, caches 26, 38 (which are secure storage located in the secure region 20), an interconnect 34 and master devices including CPU 24, GPU 32 and AI accelerator 36. Data items are transferred between the DRAM 22 and the cache 26 via the memory controller 30 and the memory protection unit 28. The data items are transferred when requested by one of the master devices and may be cached in one or more higher levels of cache associated with the CPU 24, the GPU 32, or the AI accelerator 36. As described above, data that is stored within the secure region 20 does not need to be protected. On the other hand, data that is stored outside of the secure region 20, for example, in the DRAM 22 should be protected, for example, using an encryption process or by providing integrity protection. In some alternative configurations, the dynamic secure region 20 may be differently defined, for example, the dynamic memory controller 30 may be provided on a separate chip or on the same chip but outside of a security perimeter.

Figure 3:
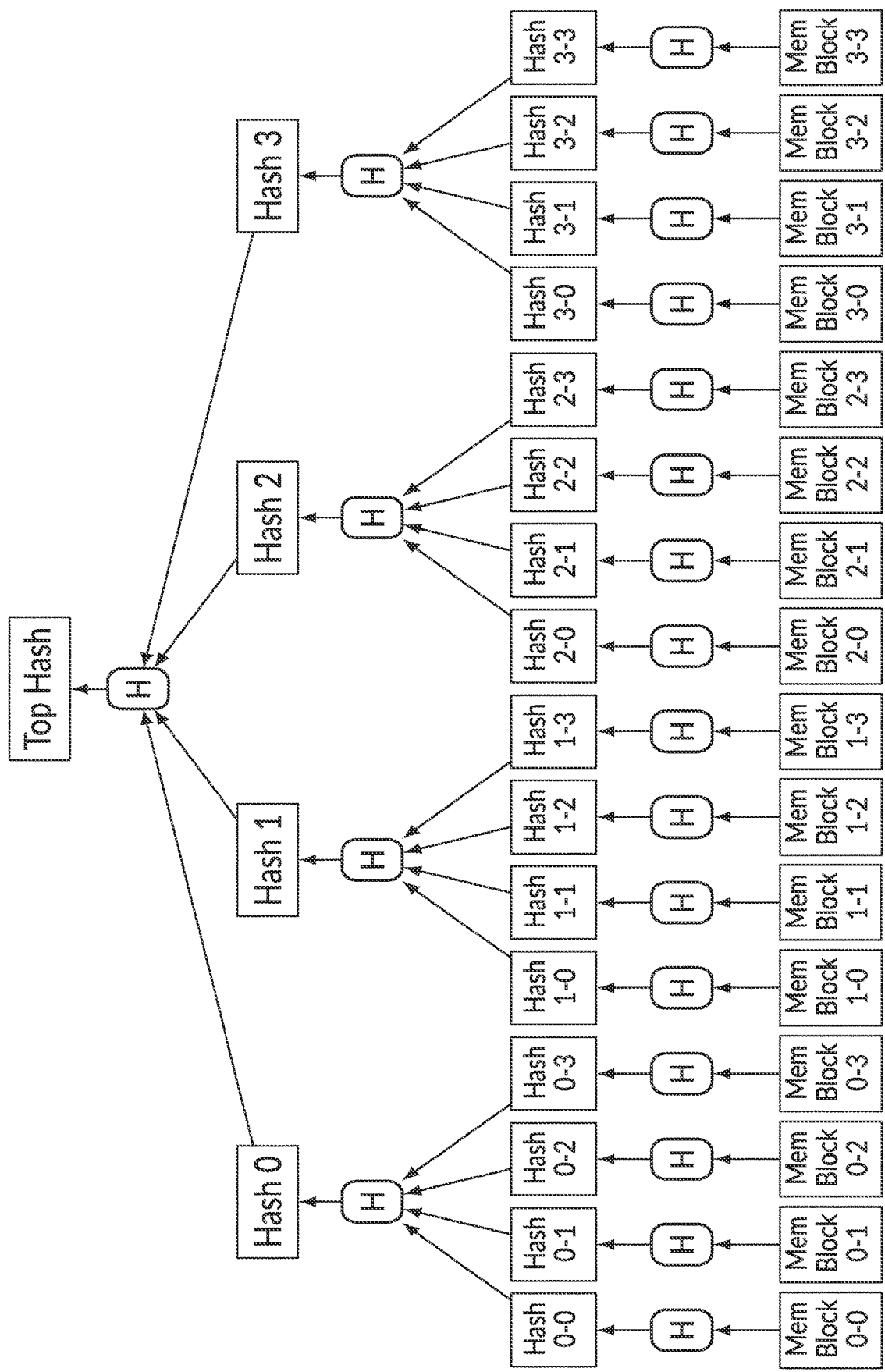
FIG. 3 schematically illustrates details of an integrity tree according to some configurations of the present techniques.

FIG. 3 schematically illustrates the concept of a data integrity tree used to protect data items in a sequence of memory blocks (Mem Block 0-0 to Mem Block 3-3). Each of the memory blocks is stored in off-chip storage. In order to validate that the data stored in the memory blocks has not been tampered with, a hash (Hash 0-0 to Hash 3-3) is generated for each of the memory blocks at the time of storage. When the data is read, the corresponding hash can also be read and compared against a newly generated version of the hash which is based on the data being read. In this way it can be determined if either the hash or the memory block has been modified during storage. For example, if Mem Block 1-2 is modified during storage then a hash generated from the data in Mem Block 1-2 will not match Hash 1-2 which was generated before the storage of Mem Block 1-2. Using such an approach can provide some assurance that the data in the memory blocks has not been modified. However, there is no guarantee from this data alone, that there has not been a modification to both the data in the memory block and the corresponding hash. Therefore, as a next level of the data integrity tree, a number of higher level hashes are formed based on the combination of the hashes generated from the data blocks. For example, Hash 0 is generated as a hash of Hash 0-0, Hash 0-1, Hash 0-2, and Hash 0-3; Hash 1 is generated as a hash of Hash 1-0, Hash 1-1, Hash 1-2, and Hash 1-3; Hash 2 is generated as a hash of Hash 2-0, Hash 2-1, Hash 2-2, and Hash 2-3; and Hash 3 is generated as a hash of Hash 3-0, Hash 3-1, Hash 3-2, and Hash 3-3. Thus, if the upper level hashes (Hash 0, Hash 1, Hash 2, and Hash 3) are stored at a same time as the hashes (Hash 0-0 to Hash 3-3) and the corresponding memory blocks, then, at a time of reading the data in the memory blocks, the integrity of the data read from the memory block (Memory Block 1-2 for example) can be achieved by re-computing the hash and comparing it against the previously stored hash (Hash 1-2 in the above example), similarly, the integrity of the hash value that is stored can be determined by re-computing the upper level hash and comparing it against the upper hash value (Hash 1 in this case) that was stored at the same time as Hash 1-0 to Hash 1-3 and the corresponding memory blocks. In the above example, the stored value of Hash 1 is compared against a hash generated from Hash 1-0, Hash 1-1, Hash 1-2, and Hash 1-3. As with the hashes (Hash 0-0 to Hash 3-3) this process cannot verify that each of the data block, the corresponding hash value, and the upper level hash value have not all been modified. Therefore, a top level hash is generated based on the upper level hashes (Hash 0, Hash 1, Hash 2, and Hash 3). The top hash can be recomputed at the time at which the data is read and can be compared against a stored value of the top hash to verify the integrity of the upper level hashes. In order to ensure that the top level hash is also not modified, the top hash is stored in secure storage, for example, on chip storage. In this way it is possible to validate the integrity of data items stored in the memory blocks.

Figure 4:
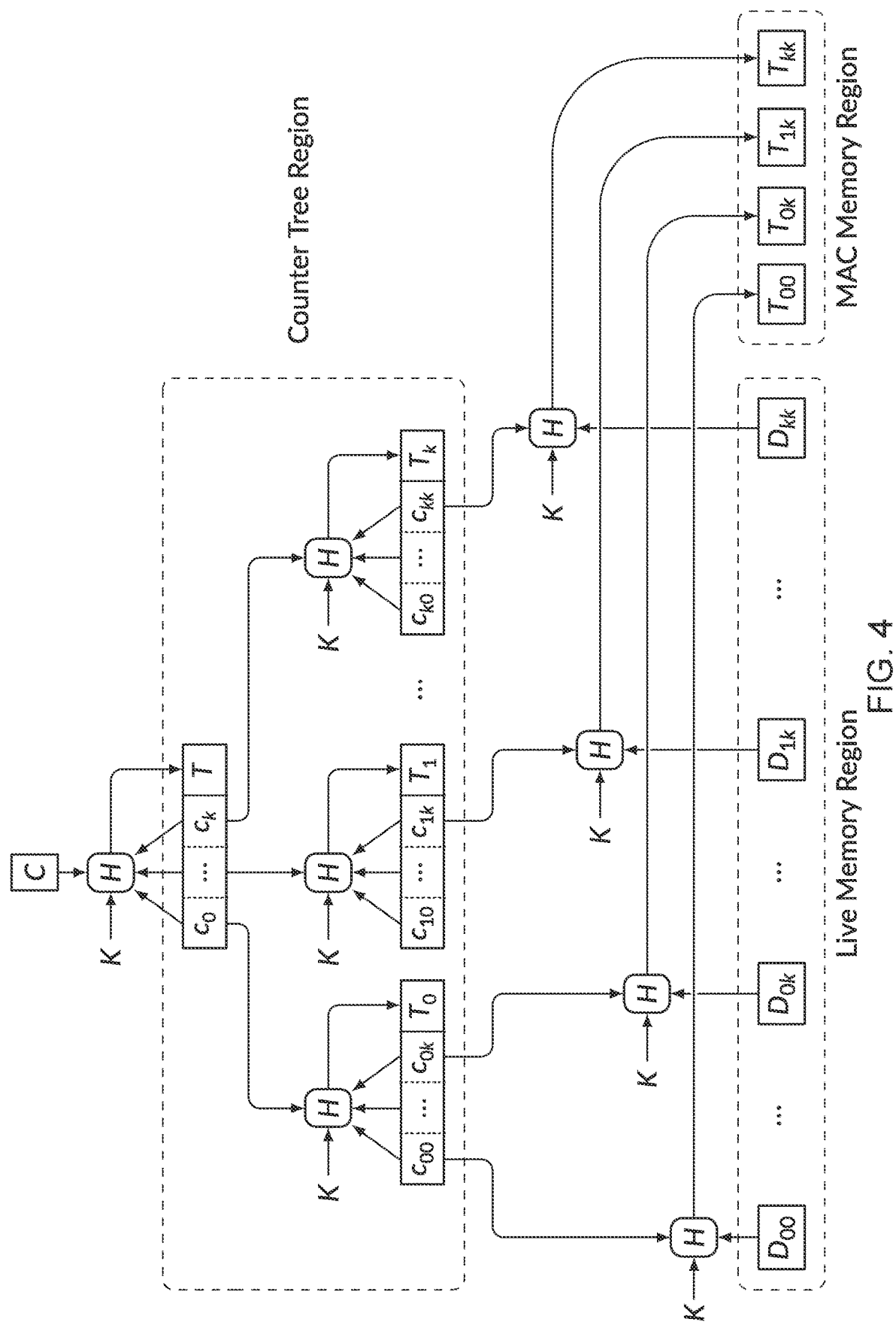
FIG. 4 schematically illustrates details of an integrity tree according to some configurations of the present techniques.

FIG. 4 schematically illustrates an alternative integrity tree for verifying the integrity of stored data. Rather than storing a tree of hash values that are generated from data items of from hash values that are stored further from the root of the integrity tree, the integrity tree stores sets of counters. The counters (denoted c in the figure) at each level are stored in association with a MAC (denoted T in FIG. 4). The MAC is generated from the associated counters and a higher level counter. Starting at the top of the tree, a single top level counter C is stored in secure storage. A top level node of the counter tree region of the integrity tree comprises a plurality of counters $c_0 \ldots c_k$ which are each associated with a next level of the counter tree region. The top level node of the counter tree also stores a MAC T which is generated from a hash of the counters $c_0 \ldots c_k$, the top level counter C, and a secret key K. In this way, the counters $c_0 \ldots c_k$ of the top level node can be validated by regenerating the MAC T and comparing it against the stored T. If any of the counters $c_0 \ldots c_k$ have changed, or if the MAC T has changed then the comparison will fail. At a next level of the counter tree region of the integrity tree, each node comprises a plurality of next level counters $c_{00} \ldots c_{kk}$ where counters $c_{i0} \ldots c_{ik}$ are associated with counter ci of the top level node of the integrity tree. Each node (i) at the next level of the counter tree region of the data integrity tree also comprises a MAC $T_i$ for i in the range $0 \ldots k$ which is generated from a hash of the counters $c_{i0} \ldots c_{ik}$ combined with the counter ci from the top level node and the secret key K. In this way, the counters $c_{i0} \ldots c_{ik}$ of node i can be validated by regenerating the MAC $T_i$ and comparing it against the stored $T_i$. If any of the counters $c_{i0} \ldots c_{ik}$, the MAC $T_i$ or the counter ci of the top level node has changed, the comparison will fail. Each counter of the next level of the counter tree region is associated with data $D_{ij}$ for i in the range $0 \ldots k$ and j in the range $0 \ldots k$ and a corresponding MAC $T_{ij}$. Each MAC $T_{ij}$ is generated from a hash of the data $D_{ij}$ in combination with the counter $c_{ij}$ and the secret key. In this way, the data $D_{ij}$ can be validated by regenerating the MAC $T_{ij}$ and comparing it against the stored $T_{ij}$. An integrity tree comprising a counter tree region can be made robust to replay attacks by incrementing (or otherwise modifying) counters before the data items are written. Modification of a counter, for example, counter $c_{i0}$ would require the MACs $T_{10}$, and $T_1$ to be recomputed. Modification of a counter of the upper level node, for example, $c_0$, would require the MACS T and $T_0$ to be recomputed.

Figure 5:
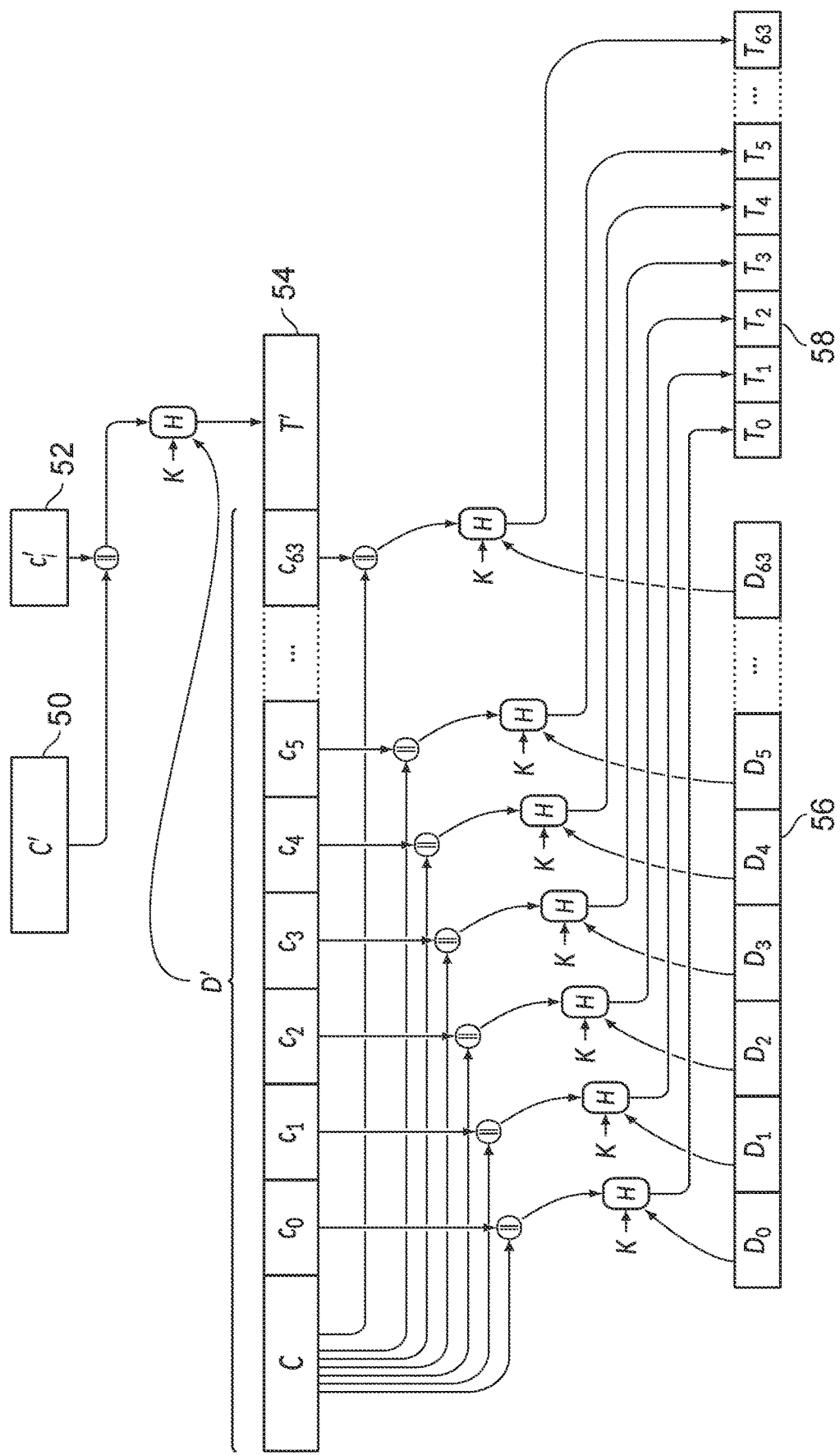
FIG. 5 schematically illustrates details of an integrity tree according to some configurations of the present techniques.

FIG. 5 schematically illustrates the use of a plurality of levels of counter within a single node of a counter tree. In the illustrated configuration the node of the counter tree 54 comprises a plurality of counters including a single major counter C and 64 minor counters $c_j$ for j in the range 0 to 63. Each of the 64 minor counters is associated with corresponding data $D_j$ and a corresponding MAC $T_j$ generated as a hash of the data $D_j$ combined with minor counter $c_j$, major counter C, and the secret key K. The provision of the counters as a set of minor counters combined with a single major counter enables the provision of a greater number of counters for the same number of bits within a node of the integrity tree. Integrity of the data $D_j$ can be determined on reading by re-computing the MAC $T_j$ and comparing it against the stored MAC $T_j$. The counters C and $c_j$ are associated with a MAC T' which is calculated based on a hash of the counters C and $c_j$ in combination with the secret key K and the major and minor counters C' and $c'_i$ from a next level node closer to the root of the integrity tree. As in the case of FIG. 4, when data $D_j$ is written to the off-chip storage the associated minor counter $c_j$ is modified to indicate mitigate against replay attacks. When the counter $c_j$ is modified, the MAC $T_j$ must be recomputed for consistency with the minor counter $c_j$. In addition, the MAC T' must be recomputed for consistency with the minor counter $c_j$. In the event that the minor counter $c_j$ overflows, the major counter C is incremented. When C is incremented each of the MACs $T_0 \ldots T_{63}$ must be recomputed for consistency with the modified major counter. In addition the MAC T' must be recomputed for consistency with the major counter C. Thus, a greater number of data items can be associated with a single node of the counter tree in this way. However, when a data item is modified a sufficient amount of times that the minor counter associated with that data item is modified, then the counter overflows and, as a result, the MACs associated with each data item that is associated with the minor counter must be recomputed.

Figure 6:
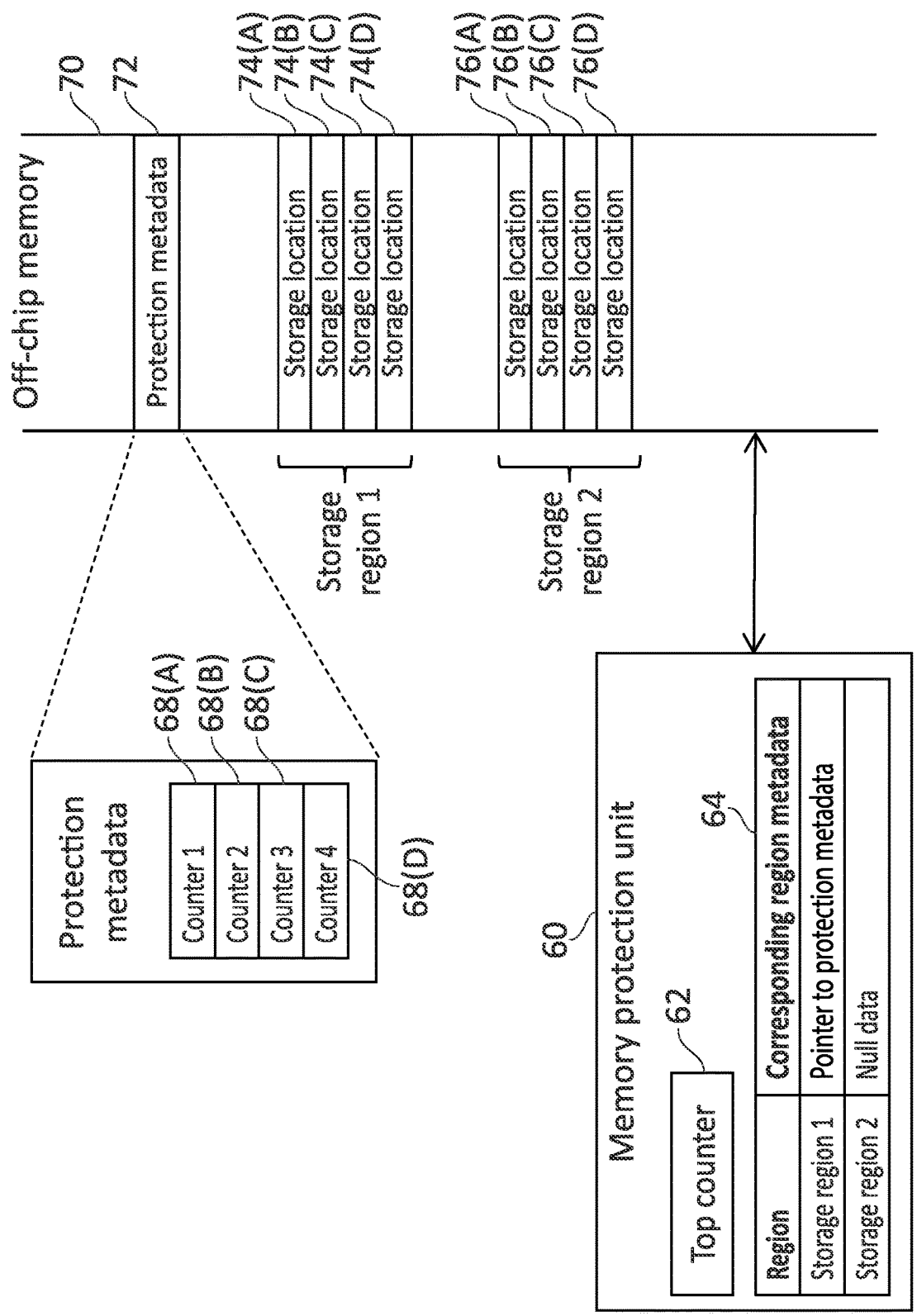
FIG. 6 schematically illustrates the storage of protection metadata in off-chip memory according to some configurations of the present techniques.

FIG. 6 schematically illustrates the use of a memory protection unit 60 according to various configurations of the present techniques. The memory protection unit 60 comprises storage circuitry to store a top counter 62 and to store the region metadata 64. Region metadata 64 identifies a plurality of regions in off-chip memory 70. Also stored in off-chip memory 70 is protection metadata 72 which stores a plurality of counters 68, and storage region 1 comprising data stored at storage locations 74 and storage region 2 comprising storage locations 76. The region metadata 64 indicates, through the provision of a valid pointer to the protection metadata 72, that storage region 1 is a protected storage region that is protected using the protection metadata 72 that is located at an address indicated by the pointer to the protection metadata 72. The protection metadata comprises a plurality of counters 68 and may also include one or more MACs (not illustrated) as discussed in relation to FIGS. 4 and 5, each of the plurality of counters corresponds to a storage location 74 in the off-chip memory 70. In particular, counter 1 68(A) corresponds to storage location 74(A), counter 2 68(B) corresponds to storage location 74(B), counter 3 68(C) corresponds to storage location 74(C) and counter 4 68(D) corresponds to storage location 74(D). The counters 68 (and, optionally, the one or more MACs) stored in the protection metadata 72 are used to protect data stored that is stored at the storage locations 74. The protection metadata is protected using the top counter 62 that is stored in the memory protection unit 60. The memory protection unit 60 is responsive to a transfer of data from secure storage to the off-chip memory to increment a counter 68 corresponding to the storage location 74 and to perform an encryption process and/or an update of integrity data based on the modified counter 68. The region metadata 64 also comprises null data stored in association with storage region 2. The null data is data that is not a valid pointer and indicates, to the memory protection unit, that storage region 2 is an unprotected storage region. Hence, the memory protection unit 60 is responsive to a transfer of data from secure storage to the off-chip memory 70 to transfer the data without performing an encryption process and/or an update of integrity data. In some configurations, the region metadata 64 also stores a per region root element that protects the integrity of the associated regions protection metadata.

Figure 7:
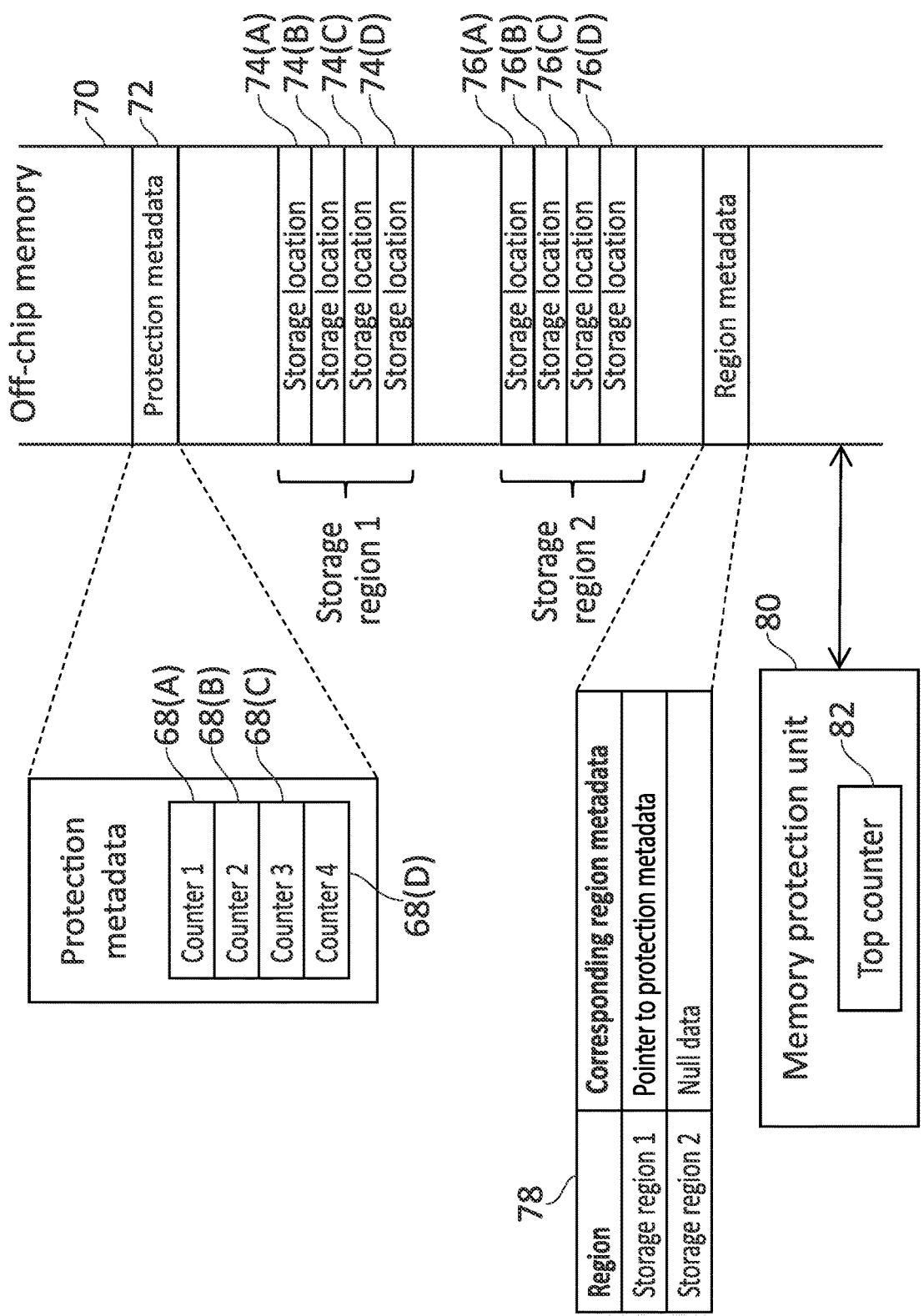
FIG. 7 schematically illustrates the storage of protection metadata in off-chip memory according to some configurations of the present techniques.

FIG. 7 schematically illustrates the use of a memory protection unit 80 according to various configurations of the present techniques. The memory protection unit 80 comprises storage circuitry to store a top counter 62. In contrast to FIG. 6, the region metadata 78 is not stored in the memory protection unit 80. Instead, the region metadata is stored in the off-chip memory. Region metadata 78 identifies a plurality of regions in off-chip memory 70. Also stored in off-chip memory 70 is protection metadata 72 which stores a plurality of counters 68, storage region 1 comprising data stored at storage locations 74, and storage region 2 comprising storage locations 76. The region metadata 78 is protected either by storing it on-chip or by storing it off-chip and providing its own protection metadata either on-chip or off-chip where, at a top level, the region metadata is protected by the top counter 82 (or a root element for the integrity tree). The addresses of the region metadata 78 and its own protection metadata are then stored on chip. The region metadata 78 stores the same information that has already been described in relation to FIG. 6 and description of the region metadata 78 will be omitted for reasons of conciseness.

Figure 8:
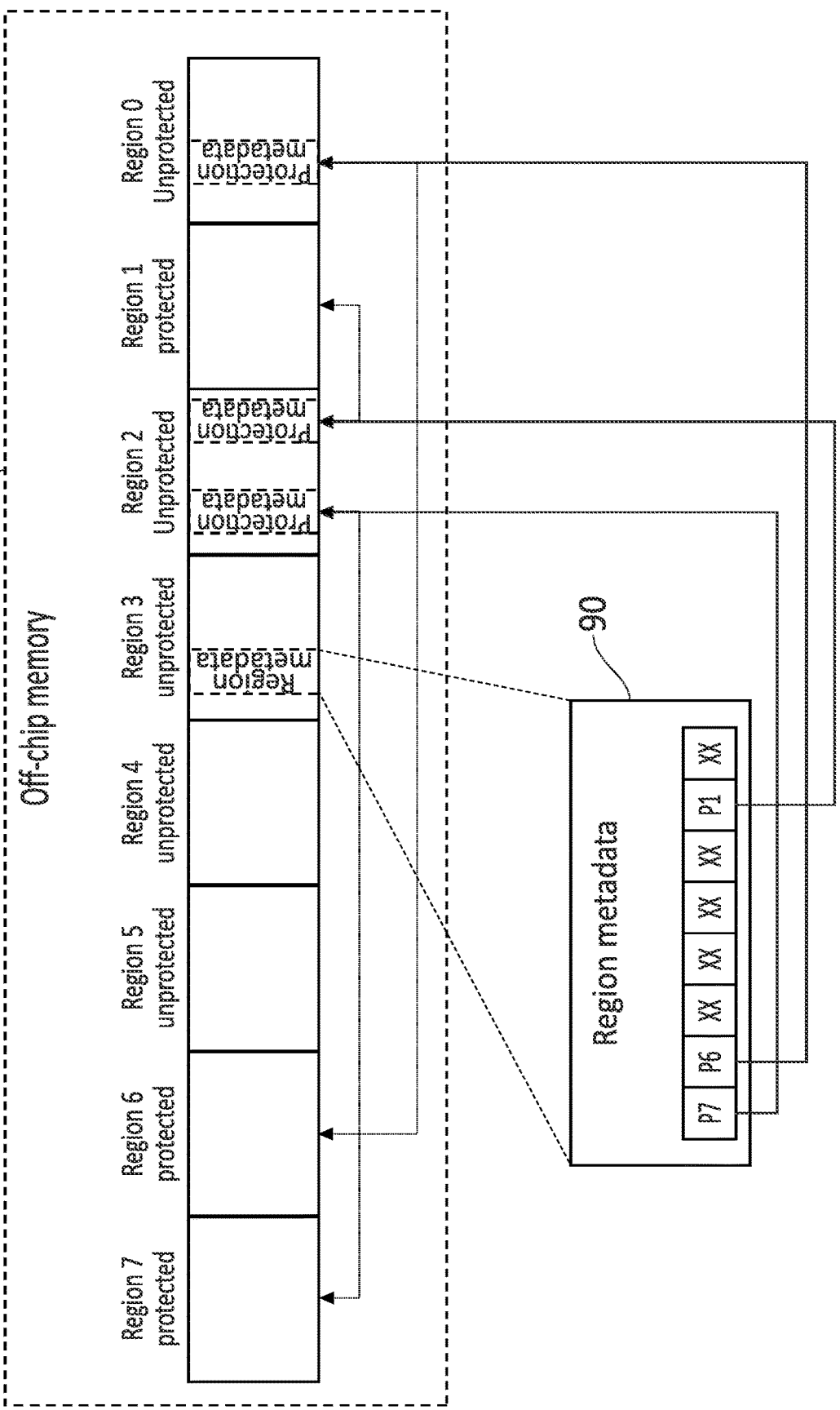
FIG. 8 schematically illustrates the storage of protection metadata in off-chip memory according to some configurations of the present techniques.

FIG. 8 schematically illustrates a layout of memory regions in off-chip memory 92 according to various configurations of the present technique. The off-chip memory is divided into eight regions. Region 0, region 2, region 3, region 4, and region are unprotected memory regions. Region 1, region 6 and region 7 are protected memory regions. For each of the protected regions there is a set of protection metadata that is stored in one of the unprotected regions. The protection metadata itself is protected by one or more of a MAC and a counter that are stored in the memory protection unit. In the illustrated configuration the region metadata 90 is stored in unprotected region 3 of the off-chip memory. The region metadata 90 comprises a sequence of pointer storage regions, one for each of the regions of the off-chip memory 92. The pointer storage regions associated with protected region 1, protected region 6, and protected region 7 each store a pointer that indicates a location of the corresponding protection metadata. Pointer region 0 of the region metadata 90 stores null data (indicated as "XX" in the figure) in place of a pointer. The storage of null data indicates that region 0 is an unprotected region and that no encryption process and/or update of integrity data is to be performed for data being transferred to this region of the off-chip storage. Pointer region 1 of the region metadata 90 stores a pointer P1. The presence of a valid pointer P1 indicates that region 1 is a protected region and the value of the pointer P1 indicates that the protection metadata for the region P1 is stored at a particular location within unprotected region 2. Pointer regions 2-5 of the region metadata 90 store null data in place of a pointer. The storage of null data indicates that regions 2-5 are unprotected regions and that no encryption process and/or update of integrity data is to be performed for data being transferred to these regions of the off-chip storage. Pointer region 6 of the region metadata 90 stores a pointer P6. The presence of a valid pointer P6 indicates that region 6 is a protected region and the value of the pointer P6 indicates that the protection metadata for the region P6 is stored at a particular location within unprotected region 0. Pointer region 7 of the region metadata 90 stores a pointer P7. The presence of a valid pointer P7 indicates that region 7 is a protected region and the value of the pointer P7 indicates that the protection metadata for the region P7 is stored at a particular location within unprotected region 2.

Figure 9:
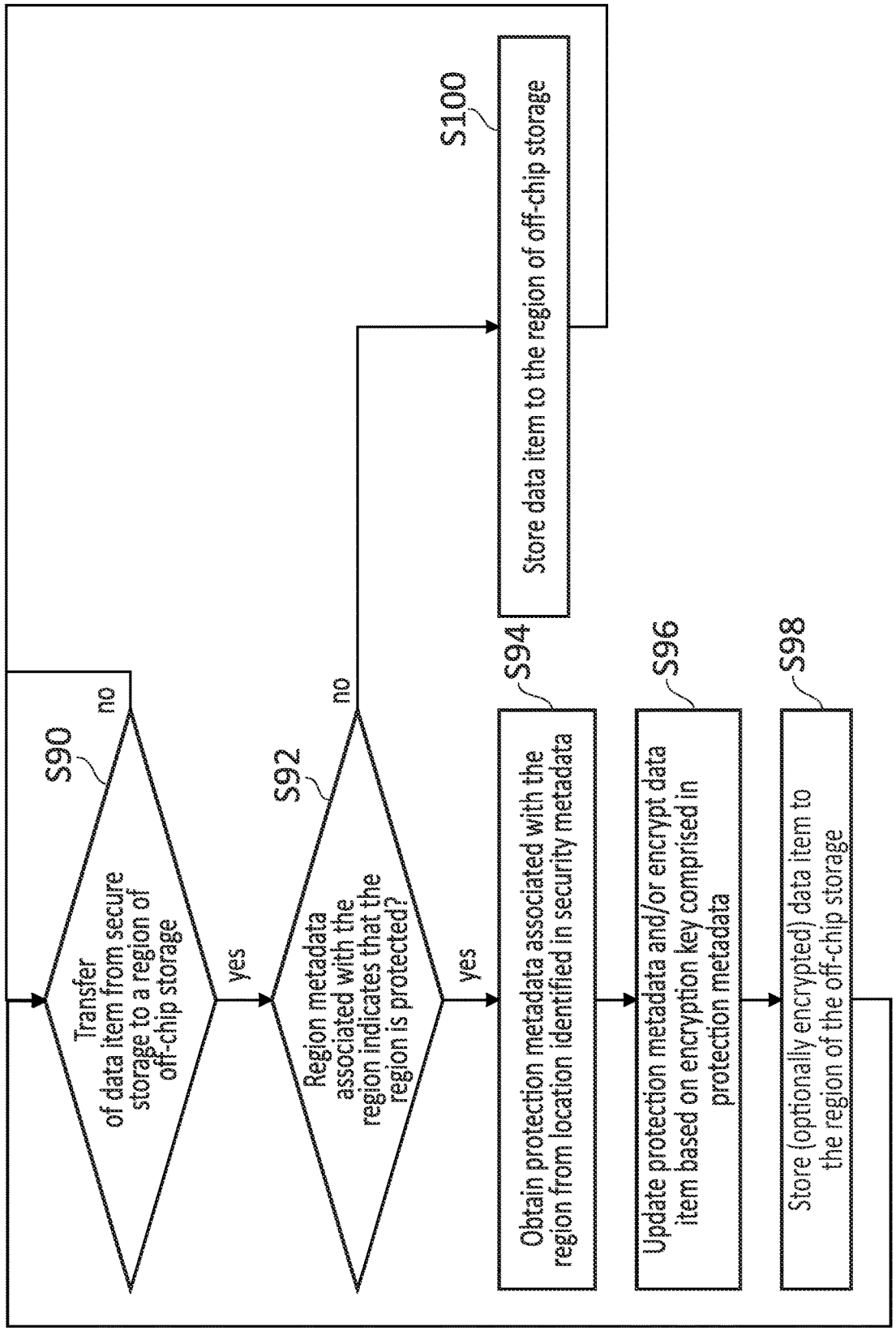
FIG. 9 schematically illustrates a sequence of steps taken by the memory protection unit according to some configurations of the present techniques.

FIG. 9 schematically illustrates a sequence of steps carried out by a memory protection unit according to various configurations of the present techniques. Flow begins at step S90 where it is determined whether a transfer of a data item from secure storage to a region of off chip storage has taken place. If no, then flow returns to step S90. If, at step S90, it was determined that a transfer of a data item from secure storage to a region of off-chip storage had taken place then flow proceeds to step S92. At step S92 the memory protection unit performs a lookup in the region metadata to determine if the region to which the data item is being transferred is a protected region. If the region to which the data is being transferred is not a protected region, then flow proceeds to step S100 where the data item is stored to the region of off-chip storage before flow returns to step S90. If, at step S92, it was determined that the region metadata indicated that the region to which the data item was being transferred was a protected region then flow proceeds to step S94. At step S94 the memory protection unit obtains the protection metadata that is associated with the region based on location information that is identified as part of the region metadata. Flow then proceeds to step S96 where protection metadata is updated (for example, by updating one or more counters of an integrity tree) to reflect the inclusion of the transferred data item. Alternatively, or in addition, the data item is encrypted using information that is stored in the protection metadata. Flow then proceeds to step S98 where the (optionally encrypted) data item is stored to the region of off-chip storage before flow returns to step S90.

Figure 10:
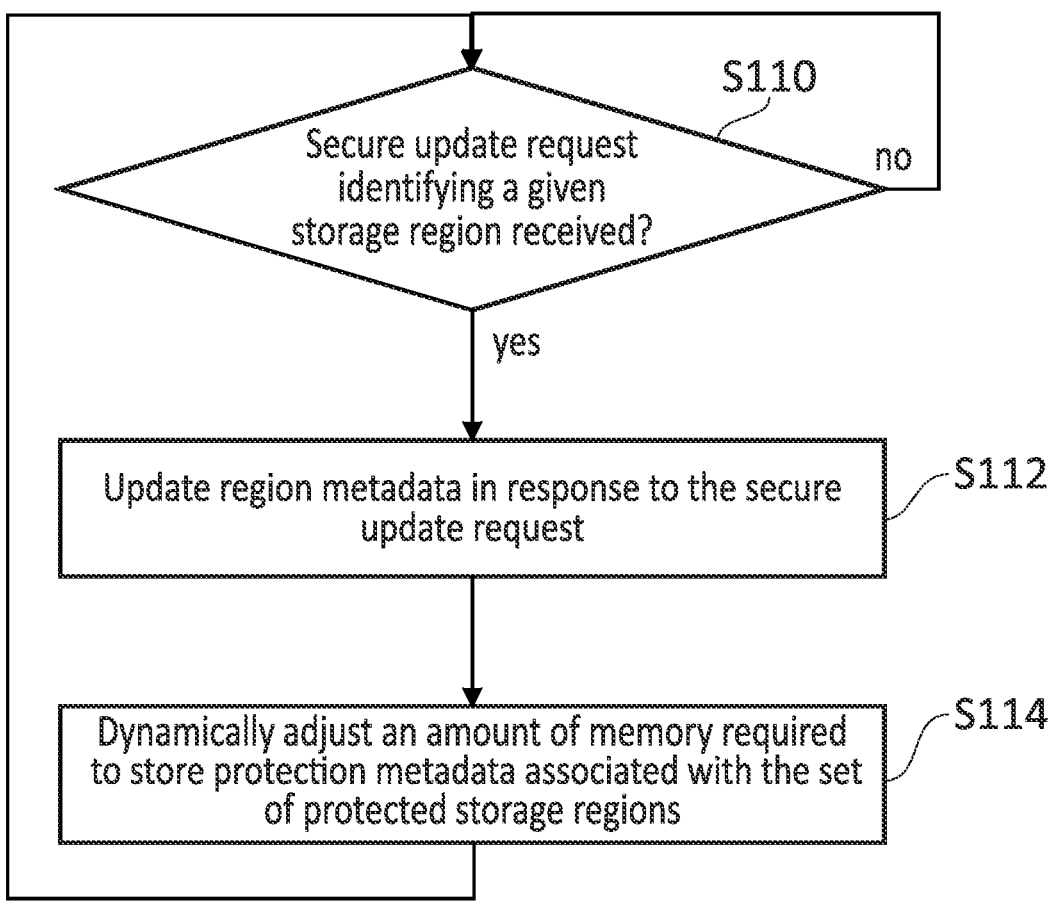
FIG. 10 schematically illustrates a sequence of steps taken by the memory protection unit according to some configurations of the present techniques.

FIG. 10 schematically illustrates a sequence of steps carried out by the memory protection unit according to various configurations of the present techniques. Flow begins at step S110 where it is determined whether a region update request identifying a given storage region has been received. If no, then flow returns to step S110. If, at step S110, it was determined that a region update request identifying a given storage region has been received then flow proceeds to step S112. At step S112, the memory protection unit updates region metadata in response to the region update request. Flow then proceeds to step S114 where the memory protection unit dynamically adjusts an amount of memory that is required to store protection metadata that is associated with the set of protected storage regions. Flow then returns to step S110.

Figure 11:
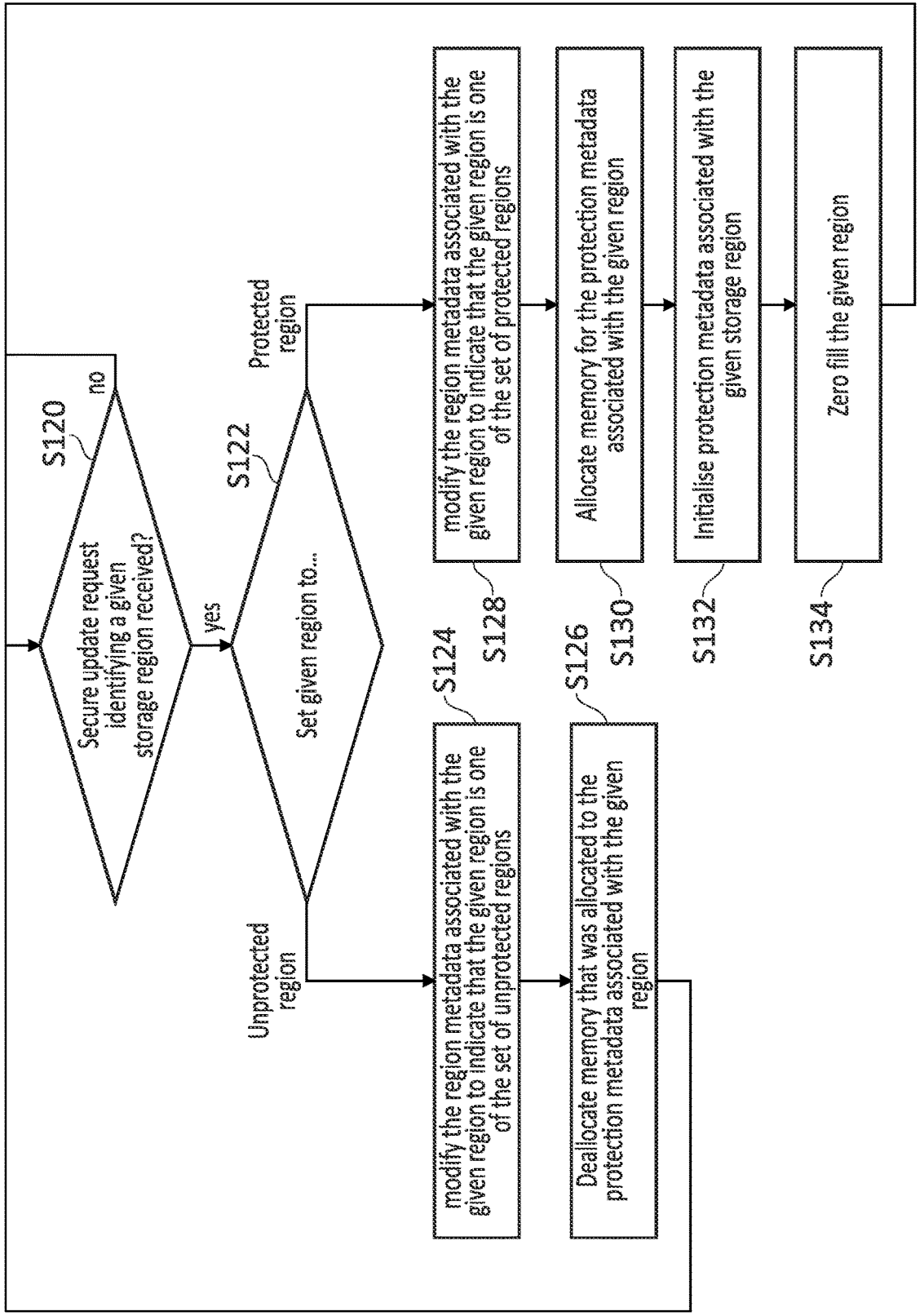
FIG. 11 schematically illustrates a sequence of steps taken by the memory protection unit according to some configurations of the present techniques.

FIG. 11 schematically illustrates further details of steps taken by a memory protection unit according to various configurations of the present techniques. Flow begins at step S120 where it is determined whether a region update request identifying a given storage region has been received. If no, then flow returns to step S120. If, at step S120, a region update request identifying a given storage region has been received, then flow proceeds to step S122. At step S122 it is determined whether the region update request indicates that the given storage region is to be set as a protected region or an unprotected region. If, at step S122, it is determined that the given storage region is to be set to an unprotected region, then flow proceeds to step S124. At step S124, the memory protection unit modifies the region metadata associated with the given region to indicate that the given region is one of the set of unprotected regions. Flow then proceeds to step S126 where the memory protection unit deallocates memory that was previously allocated to the protection metadata that was associated with the given region before it was set to be an unprotected region. Flow then returns to step S120. If, at step S122, it was determined that the region update request indicated that the given region was to be set to a protected region then flow proceeds to step S128. At step S128, the memory protection unit modifies the region metadata associated with the given region to indicate that the given region is one of the set of protected regions. Flow then proceeds to step S130, where the memory protection unit allocates memory to be used for the protection metadata that is associated with the given region. Flow then proceeds to step S132 where the protection metadata associated with the given storage region is initialised, for example, by setting the protection metadata to random protection metadata or by setting the protection metadata based on historical protection metadata associated with that region that is stored in the region metadata. Flow then proceeds to step S134 where the given region is zero filled to initialise it as a protected region. Flow then returns to step S120.

Figure 12:
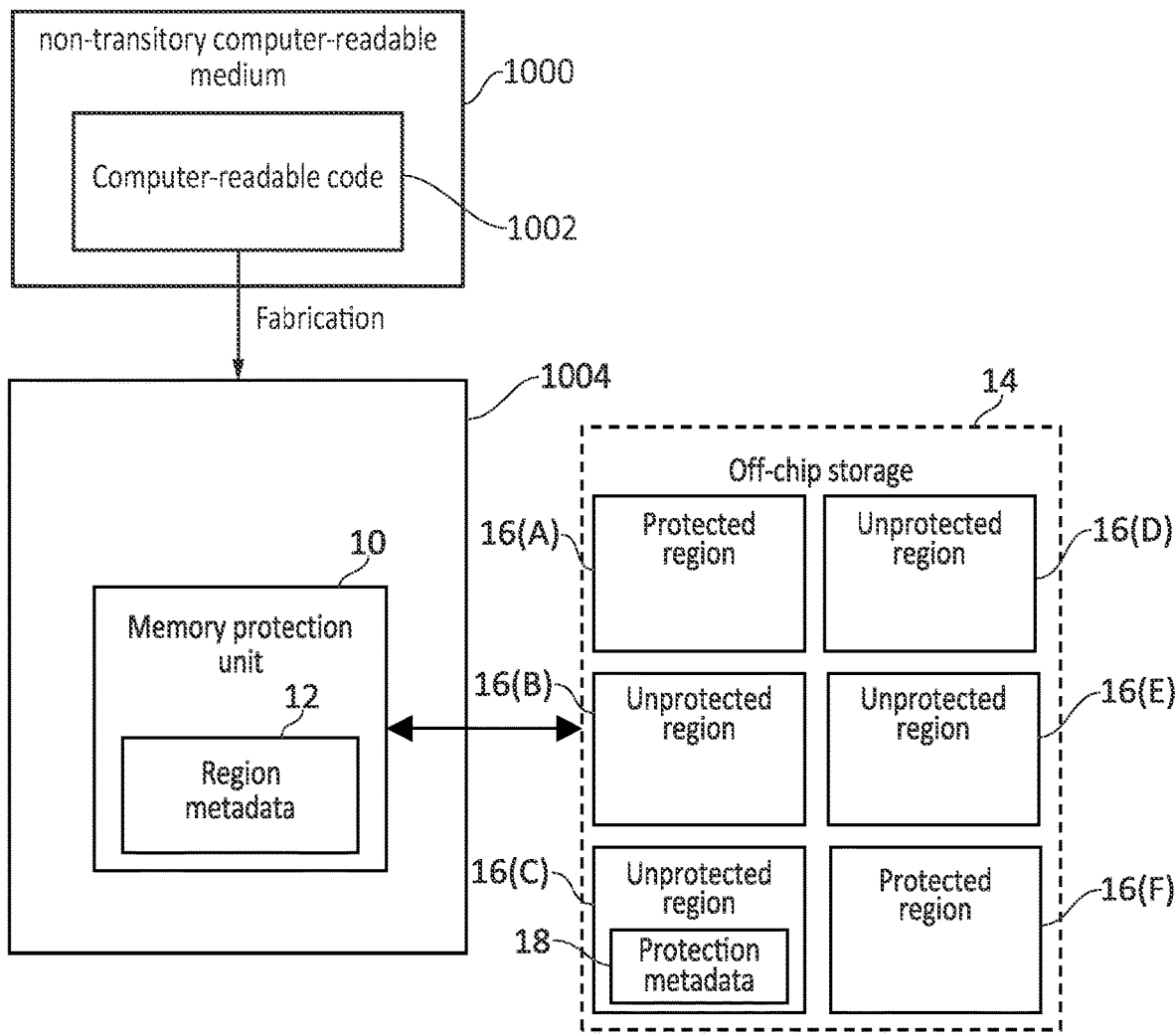
FIG. 12 schematically illustrates a memory protection unit according to various configurations of the present techniques.

FIG. 12 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises a memory protection unit 10 storing region metadata 12 where the memory protection unit 10 is arranged to maintain, in the region metadata, information indicative of protected and unprotected regions in off-chip storage 14 as described in FIG. 1.

In brief overall summary there is provided a memory protection unit configured to maintain region metadata associated with storage regions of off-chip storage and protection metadata associated with each of the storage regions. The protection metadata is stored in the off-chip storage, and the region metadata encodes whether each of the storage regions belongs to a set of protected storage regions or to a set of unprotected storage regions and encodes information indicating corresponding protection metadata associated with each storage region. The memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Configurations of the present techniques are also described by the following numbered clauses:

Clause 1. A memory protection unit configured to maintain region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions, wherein the memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

Clause 2. The memory protection unit of clause 1, wherein the protection metadata comprises encryption metadata indicative of an encryption key used to encrypt data stored in one or more of the protected storage regions.

Clause 3. The memory protection unit of clause 1 or clause 2, wherein the protection metadata comprises integrity protection metadata generated from and representative of data stored in one or more of the protected storage regions.

Clause 4. The memory protection unit of any preceding clause, further comprising metadata storage circuitry to securely store at least a portion of the region metadata.

Clause 5. The memory protection unit of clause 4, wherein the memory protection unit is configured to store a further portion of the region metadata in the unprotected storage regions of the off chip storage; and the portion comprises region integrity protection metadata generated from and representative of the further portion of the region metadata.

Clause 6. The memory protection unit of clause 5, wherein:
the portion further comprises region encryption metadata indicative of a region encryption key used to encrypt the further portion; and
the memory protection unit is responsive to the region update request to modify the region metadata associated with the given storage region, and to update the region encryption metadata.

Clause 7. The memory protection unit of any preceding clause, wherein the memory protection unit is responsive to a transfer of a data item from secure storage to a region of the off-chip storage and when the region metadata associated with the region indicates that the region belongs to the set of protected storage regions, to perform a protection process to protect the data item, the protection process based on the protection metadata identified in the region metadata as being associated with the region.

Clause 8. The memory protection unit of clause 7, wherein the protection process comprises generating an encrypted data item by performing an encryption process on the data item, the encryption process based on encryption metadata comprised in the protection metadata identified in the region metadata as being associated with the region, and to transfer the encrypted data item to the region of the off-chip storage.

Clause 9. The memory protection unit of clause 8, wherein the encryption process comprises encrypting the data item using an encryption key derived based on a global encryption key modified based on the region metadata encryption information.

Clause 10. The memory protection unit of clause 8 or clause 9, wherein the memory protection unit is responsive to the transfer of the data item from the secure storage to the region of off-chip storage and when the region metadata associated with the region indicates that the region belongs to the set of unprotected storage regions, to transfer the data item to the region of the off-chip storage without performing the encryption process.

Clause 11. The memory protection unit of any of clauses 7 to 10, wherein the protection process comprises updating the protection metadata associated with the region.

Clause 12. The memory protection unit of clause 11, wherein each storage region comprises a plurality of storage locations, and the memory protection unit is configured to maintain, as part of the protection metadata, data location specific integrity protection metadata associated with each of the plurality of storage locations that comprise that storage region.

Clause 13. The memory protection unit of clause 11 or clause 12, wherein the protection metadata comprises integrity protection metadata associated with the region and the protection process comprises updating multiple levels of the integrity protection metadata.

Clause 14. The memory protection unit of any of any preceding clause, wherein the memory protection unit is responsive to the region update request, when the given storage region is one of the set of unprotected storage regions and the region update request is to modify the given storage region such that it belongs to the set of protected storage regions, to perform a protected region initialisation process comprising modifying the region metadata associated with the given region to indicate that the given region is one of the set of protected regions, allocating memory in the off-chip storage to store protection metadata associated with the given storage region, and initialising the protection metadata associated with the given storage region.

Clause 15. The memory protection unit of clause 14, wherein the protected region initialisation processes comprises zero filling the given storage region.

Clause 16. The memory protection unit of clause 14 or clause 15, wherein the memory protection unit is configured to:
encode, as part of the region metadata, historical protection data associated with each storage region; and
initialise the protection metadata associated with the given storage region as new protection metadata that is not included in the historical protection metadata associated with the given storage region.

Clause 17. The memory protection unit of clause 16, wherein:
the protection metadata is integrity tree information comprising a plurality of counters associated with the region; and
the historical protection data associated with each storage region comprises a largest counter value of the plurality of counters associated with that storage region.

Clause 18. The memory protection unit of clause 17, wherein the new protection metadata comprises a next counter value subsequent to the largest counter value.

Clause 19. The memory protection unit of clause 17 or clause 18, wherein the historical protection metadata is initialised to a predefined value.

Clause 20. The memory protection unit of any of clause 17 to clause 19, wherein the plurality of counters are arranged in a tree structure and each counter is implemented as one of:
a counter;
a linear feedback shift register; and
a non-linear feedback shift register.

Clause 21. The memory protection unit of clause 14 or clause 15, wherein initialising the protection metadata associated with the given storage region comprises generating random encryption data.

Clause 22. The memory protection unit of any preceding clause, wherein the memory protection unit is responsive to the region update request, when the given storage region is one of the set of unprotected storage regions and the region update request is to modify the given storage region such that it belongs to the set of protected storage regions, to perform an unprotected region initialisation process comprising modifying the region metadata associated with the given region to indicate that the given region is one of the set of unprotected regions and deallocating memory that was allocated to the protection metadata associated with the given region.

Clause 23. The memory protection unit of any preceding clause, wherein the information indicating the corresponding protection metadata associated with each storage region belonging to the set of protected storage regions is a protection metadata pointer indicative of a storage location of the protection metadata associated with that storage region.

Clause 24. The memory protection unit of clause 23, wherein the memory protection unit is configured to encode information indicating storage regions that belong to the set of non-protected storage regions by setting null data as the protection metadata pointer associated with those regions.

Clause 25. The memory protection unit of any preceding claim, wherein the memory protection unit is configured to store the protection metadata in one or more of the set of unprotected storage regions of the off-chip storage and to protect the protection metadata using top level protection metadata.

Clause 26. A non-transitory computer readable medium to store computer-readable code for fabrication of the memory protection unit of any preceding clause.

We claim:

1. A memory protection unit configured to maintain:
region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions,
wherein the memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

2. The memory protection unit of claim 1, wherein the protection metadata comprises encryption metadata indicative of an encryption key used to encrypt data stored in one or more of the protected storage regions.

3. The memory protection unit of claim 1, wherein the protection metadata comprises integrity protection metadata generated from and representative of data stored in one or more of the protected storage regions.

4. The memory protection unit of claim 1, further comprising metadata storage circuitry to securely store at least a portion of the region metadata.

5. The memory protection unit of claim 4, wherein:
the memory protection unit is configured to store a further portion of the region metadata in the unprotected storage regions of the off chip storage; and
the portion comprises region integrity protection metadata generated from and representative of the further portion of the region metadata.

6. The memory protection unit of claim 5, wherein:
the portion further comprises region encryption metadata indicative of a region encryption key used to encrypt the further portion; and
the memory protection unit is responsive to the region update request to modify the region metadata associated with the given storage region, and to update the region encryption metadata.

7. The memory protection unit of claim 1, wherein the memory protection unit is responsive to a transfer of a data item from secure storage to a region of the off-chip storage and when the region metadata associated with the region indicates that the region belongs to the set of protected storage regions, to perform a protection process to protect the data item, the protection process based on the protection metadata identified in the region metadata as being associated with the region.

8. The memory protection unit of claim 7, wherein the protection process comprises generating an encrypted data item by performing an encryption process on the data item, the encryption process based on encryption metadata comprised in the protection metadata identified in the region metadata as being associated with the region, and to transfer the encrypted data item to the region of the off-chip storage.

9. The memory protection unit of claim 8, wherein the encryption process comprises encrypting the data item using an encryption key derived based on a global encryption key modified based on the region metadata encryption information.

10. The memory protection unit of claim 7, wherein the protection process comprises updating the protection metadata associated with the region.

11. The memory protection unit of claim 10, wherein each storage region comprises a plurality of storage locations, and the memory protection unit is configured to maintain, as part of the protection metadata, data location specific protection metadata associated with each of the plurality of storage locations that comprise that storage region.

12. The memory protection unit of claim 10, wherein the protection metadata comprises integrity protection metadata associated with the region and the protection process comprises updating multiple levels of the integrity protection metadata.

13. The memory protection unit of claim 1, wherein the memory protection unit is responsive to the region update request, when the given storage region is one of the set of unprotected storage regions and the region update request is to modify the given storage region such that it belongs to the set of protected storage regions, to perform a protected region initialisation process comprising modifying the region metadata associated with the given region to indicate that the given region is one of the set of protected regions, allocating memory in the off-chip storage to store protection metadata associated with the given storage region, and initialising the protection metadata associated with the given storage region.

14. The memory protection unit of claim 13, wherein the memory protection unit is configured to:
encode, as part of the region metadata, historical protection metadata associated with each storage region; and
initialise the protection metadata associated with the given storage region as new protection metadata that is not included in the historical protection metadata associated with the given storage region.

15. The memory protection unit of claim 14, wherein:
the protection metadata is integrity tree information comprising a plurality of counters associated with the region; and
the historical protection data associated with each storage region comprises a largest counter value of the plurality of counters associated with that storage region.

16. The memory protection unit of claim 1, wherein the memory protection unit is responsive to the region update request, when the given storage region is one of the set of protected storage regions and the region update request is to modify the given storage region such that it belongs to the set of unprotected storage regions, to perform an unprotected region initialisation process comprising modifying the region metadata associated with the given region to indicate that the given region is one of the set of unprotected regions and deallocating memory that was allocated to the protection metadata associated with the given region.

17. The memory protection unit of claim 1, wherein the information indicating the corresponding protection metadata associated with each storage region belonging to the set of protected storage regions is a protection metadata pointer indicative of a storage location of the protection metadata associated with that storage region.

18. The memory protection unit of claim 1, wherein the memory protection unit is configured to store the protection metadata in one or more of the set of unprotected storage regions of the off-chip storage and to protect the protection metadata using top level protection metadata.

19. A method of operating a memory protection unit comprising:
maintaining region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions; and
updating the region metadata in response to a region update request identifying a given storage region for which the region metadata is to be modified and dynamically adjusting an amount of memory required to store protection metadata associated with the set of protected storage regions in response to the update to the region metadata.

20. A non-transitory computer readable medium to store computer-readable code for fabrication of a memory protection unit configured to maintain region metadata associated with storage regions of off-chip storage and protection metadata associated with each of the storage regions, wherein the protection metadata is stored in the off-chip storage, and the region metadata encodes whether each of the storage regions belongs to a set of protected storage regions or to a set of unprotected storage regions and encodes information indicating corresponding protection metadata associated with each storage region belonging to the set of protected storage regions,
wherein the memory protection unit is configured to update the region metadata in response to a region update request identifying a given storage region for which the region metadata is to be modified and to dynamically adjust an amount of memory required to store protection metadata associated with the set of protected storage regions in response to the update to the region metadata.

* * * * *